United States Patent [19]

Custer

[11] Patent Number: 4,574,833

[45] Date of Patent: Mar. 11, 1986

[54] EXCESS FLOW CONTROL DEVICE

[76] Inventor: Craig S. Custer, 1430 NE. 28th Ct., Pompano Beach, Fla. 33064

[21] Appl. No.: 617,882

[22] Filed: Jun. 6, 1984

[51] Int. Cl.[4] .............................................. F16K 17/28
[52] U.S. Cl. .................................... 137/498; 137/460; 137/517; 251/65
[58] Field of Search ............... 137/498, 460, 528, 529, 137/517, 504; 251/65

[56] References Cited

U.S. PATENT DOCUMENTS

| | | | |
|---|---|---|---|
| 2,569,316 | 9/1951 | Jerman | 251/65 X |
| 2,646,071 | 7/1953 | Wagner | 137/528 |
| 3,200,214 | 8/1965 | Aubert | 137/498 X |
| 3,360,007 | 12/1967 | Haidek et al. | 137/528 |
| 4,210,174 | 7/1980 | Eross | 137/528 |

FOREIGN PATENT DOCUMENTS 913652  9/1946  France ................. 137/517

Primary Examiner—Martin P. Schwadron
Assistant Examiner—Stephen M. Hepperle
Attorney, Agent, or Firm—Melvin K. Silverman

[57] ABSTRACT

A fluid control device includes a reciprocating valve comprising a ferromagnetic armature capable of receiving an axis of magnetic polarity corresponding to its axis of reciprocation, the axis generally also corresponding to the longitudinal center of a chamber within said housing, said chamber having a greater radius than the radius of the valve which moves within the chamber. The valve also exhibits a flow-responsive rear radial end face located within a region of communication between said inlet and outlet passages. The valve further has a front end face capable of closing the fluid outlet passage of the device. Further provided is a bias and calibration means located in the housing and disposed co-linearly and distal-proximately to the valve, near the rear radial end face thereof, opposite to the flow-responsive rear radial end of the valve. The bias and calibration means possesses an axis of magnetic polarity substantially co-linear with the magnetic axis of the valve wherein the magnetic properties or polarities of the valve and of the bias means are in the nature of an attractive mode there between. The flow control device also includes a means for changing the axial distal-proximate position of the bias means relative to the valve to thereby calibrate the degree of attraction between the bias means and the valve and, also, to define the geometry of that part of the region of inlet-outlet communication that passes between the flow-responsive rear radial end face of the valve and the bias means.

6 Claims, 3 Drawing Figures

EXCESS FLOW CONTROL DEVICE

BACKGROUND OF THE INVENTION

This invention relates to a fluid control device having a reciprocating valve capable of digitally controlling the flow of fluid therethrough in which the point of digital actuation between "on" and "off" states can be controlled across a wide range of pressures and flow rates. Viewed in another sense, the prior art relates to magnetic relief valves employing therein such mechanical elements as diaphragms and spring bias ball checks with which to open or close responsive to small changes in fluid pressure.

In certain applications there is a need for a simple and relatively low cost valve that will actuate when the fluid flow pressure reaches an upper value and, similarly, that will reset when the fluid pressure falls to a lower value. Prior art in the present area is, to the best knowledge of the inventor, represented by U.S. Pat. Nos. 3,122,162 to Sands; 3,495,620 to Raimondi; 3,921,662 to Hauffe; 4,019,531 to Johnson; and 4,128,105 to Follett.

The present invention is believed to be properly classified in one or more of the following subclasses: U.S. Class 137, Subclasses 498, 517, 529; and U.S. Class 251, Subclass 30.

SUMMARY OF THE INVENTION

The present invention relates to fluid flow control device including a housing, a fluid inlet passage therein, and a fluid outlet passage in communication with said fluid inlet passage. The control device includes a reciprocating valve capable of permitting, limiting or precluding communication between said inlet and outlet passages, said valve comprising a ferromagnetic armature capable of receiving an axis of magnetic polarity corresponding to its axis of reciprocation, said magnetic axis also corresponding to the longitudinal center of an elongated chamber within said housing, said chamber having a greater radius than the radius of said reciprocating valve, said valve having a flow-responsive rear radial end face disposed in a region of communication between said inlet and outlet passages, said valve occupying at least a part of the region of inlet-outlet communication, said valve further having a front end face capable of closing said fluid outlet passage. The fluid flow device also includes bias and calibration means disposed in the housing, and co-linearly and distal-proximately to said reciprocating valve near said rear radial end face thereof, opposite to said flow-responsive radial end face. Bias and calibration means are provided with an axis of magnetic polarity substantially co-linear with the magnetic axis of said reciprocating valve, wherein the magnetic properties or polarities of said valve and bias means define an attraction mode with respect to each other. Also included in the flow control device are means for changing the axial distal-proximate position of said bias means relative to the flow-responsive end face of said reciprocating valve, said bias means comprising means for calibrating the degree of attraction between said bias means and said valve and, further, comprising means for defining the geometry of that part of the region of inlet-outlet communication existing between said flow-response rear radial end face of said valve and said bias means, whereby the rate of flow through the inlet passage that will cause closure of the reciprocating valve may be calibrated by the distal-proximate adjustment of said bias means relative to said flow-responsive rear end face of the reciprocating valve.

An object of the present invention is to provide a valve that will cut off or restrict fluid flow in the event of the occurrence of excessive flow rate. Another object is to provide a valve of the above type in which the level of fluid flow causing cut-off actuation may be varied.

A further object of the present invention is to provide a fluid control device of the above type in which the cut-off level of fluid flow can be regulated across a broad range of rates and pressures.

The above and yet further objects and advantages of the present invention will become apparent from the hereinafter set forth Detailed Description of the Invention, the drawings and appended claims.

DETAILED DESCRIPTION OF THE INVENTION

Figure 1:
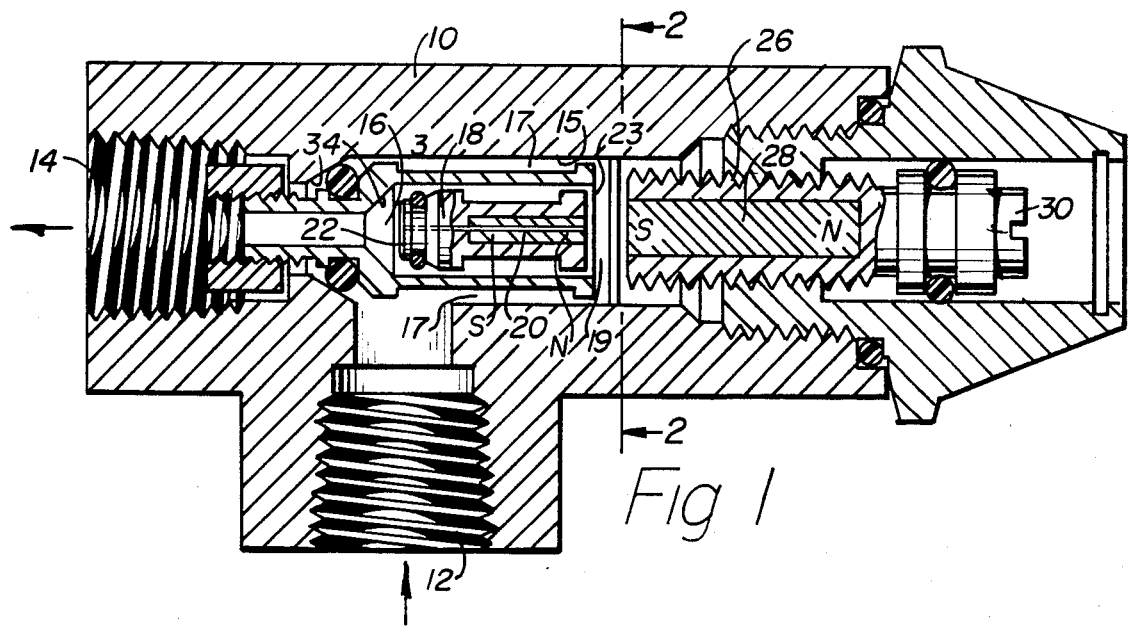
FIG. 1 is a longitudinal cross-sectional schematic view of a first embodiment of the present invention.

With reference to FIG. 1, there is shown a first embodiment of the inventive excess flow control device which includes a housing 10, a fluid inlet passage 12, and a fluid outlet pass 14 which is in communication with said fluid inlet passage 12.

Figure 2:
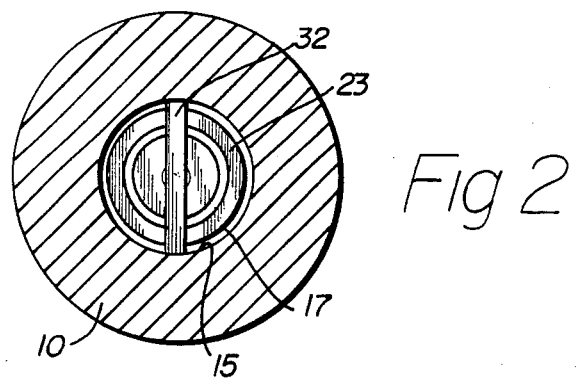
FIG. 2 is a cross-sectional radial view, taken along Line 2—2 of FIG. 1.

A region of communication 16 exists between said inlet and outlet passages 12 and 14 respectively. The dimensions of said region 16 are generally defined by a chamber 15 within said housing in which is disposed a reciprocating valve 18 capable of permitting, limiting or precluding communication between said inlet and outlet passages. Said valve 18 includes a ferromagnetic armature capable of receiving an axis of magnetic polarity 20 corresponding to its axis of reciprocation within said chamber 15. Said magnetic axis 20 generally corresponds to the longitudinal center of said chamber 15 which possesses a greater radius than the radius of said valve 18. The reciprocating valve 18 includes a flow-responsive rear radial end face 23 disposed within said region 16 of chamber 15. In that valve the valve 18 occupies at least a part 19 of said region 16 of inlet-outlet communication, a path of fluid flow, beginning at inlet 12, continuing through annular passage 17, passing into volumetric part 19 and, when the valve 18 is not actuated, exiting through annular passage 17, is defined. Accordingly, the path, from inlet 12, through annular passage 17, into volumetric part 19, out of annular passage 17, to communication region 16 proper and outlet 14, will be exposed to fluid flow and therefore fluid pressures. Particularly, the rear end face 23 is disposed in a location within volumetric part 19 of region 16 that will be flow-responsive to the fluid parameters of interest in controlling excess flow conditions. The radial cross-sectional view of FIG. 2 shows a restraining element 32 which defines the furthest downward position of end face 23 into part 19 that can occur.

The valve 18 is also provided with a front end face 22 which, upon actuation of valve 18, will seat within annular shoulder 34 to block fluid flow to the outlet 14.

The present excess flow control device also includes bias and calibration means 26 disposed in housing 10, co-linearly and distal-proximately to said reciprocating valve 18 and near said rear radial end face 23 thereof. See FIG. 1. Said bias and calibration means 26 possesses an axis of magnetic polarity 28 which is substantially co-linear with said magnetic axis 20 of the reciprocating valve 18. As may be noted by the arrangement of magnetic poles shown in FIG. 1, the magnetic polarities or properties of the reciprocating valve 18 and the bias means 26 will define a mode of attraction with respect to each other.

Further provided are means 30 for changing the axial distal-proximate position of said bias means 26 relative to said reciprocating valve to thereby calibrate the degree of attraction between said bias means 26 and said valve 18. Through adjustment of the axial position of bias means 26 relative to valve 18, the geometry of volumetric part 19 is also defined. Thereby, the volume, shape and, thereby, the various flow parameters of the fluid across end face 23 may be changed through the distal-proximate positioning of bias means 26 relative to valve 18. Through such adjustment of the position of bias means 26, the rate and pressure of flow through inlet passage 12 that is capable of causing a closure may be controlled through a simple adjustment of screw 30 which is wholly external to the fluid passages. Accordingly, the pressure level flow rate or other parameter of inlet-outlet flow that can cause the closure of valve 18, may be easily adjusted through use of the external adjustment means 30.

It has been found that line pressure variances from virtually zero to 4,000 pounds per square inch may be utilized with the present inventive flow control device.

Figure 3:
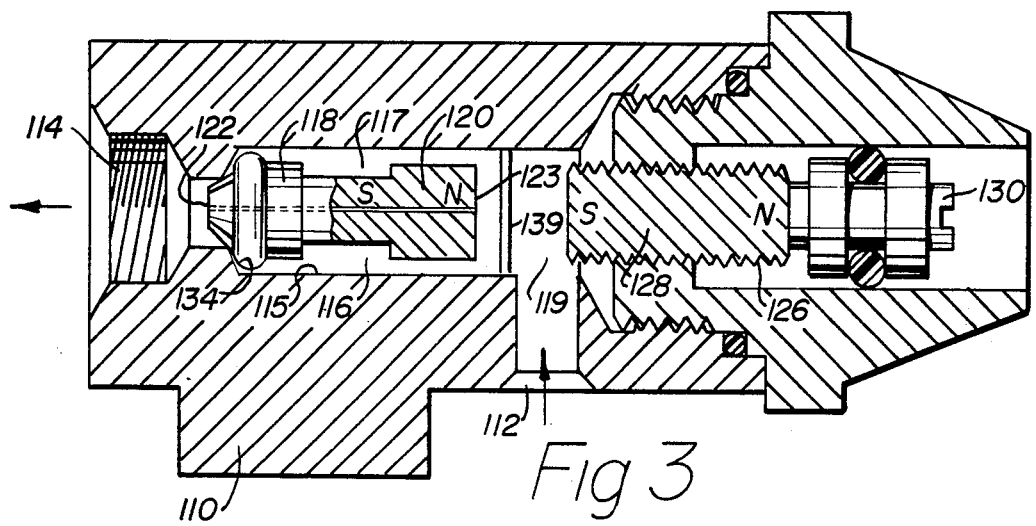
FIG. 3 is a cross-sectional longitudinal schematic view of a second embodiment of the present invention.

A second embodiment of the present invention is shown in FIG. 3 in which the reference numerals assigned thereto correspond to those of the embodiment of FIG. 1 in which, however, each two digit designation is preceeded with the digit "1" to designate the second embodiment.

The embodiment of FIG. 3 differs from the embodiment of FIG. 1 principally in the position of fluid inlet passage 112 relative to the flow-responsive rear end face 123 of the reciprocating valve 118. That is, in the embodiment of FIG. 3, the flow responsive end face 123 is disposed directly within the line of fluid flow from inlet passage 112. Accordingly, the embodiment of FIG. 3 is more directly responsive to changes in flow parameters than is the embodiment of FIG. 1. However, where extremely fine tuning of the actuation point is desired, the embodiment of FIG. 1 has been found to be more suitable. In other respects the second embodiment is identical to the first and, in particular, it is characterized in that the flow parameters causing closure of the reciprocating valve 18 can be carefully calibrated through the rotation of position means 130 to change the distalproximate position of bias and calibration 126 relative to end face 123, thereby, changing both the degree of magnetic attraction between axes 120 and 128 and, as well, changing the geometry of volumetric part 119 of the region 116 of communication between the inlet and outlet passages.

It is noted that, in either embodiment, the reciprocating valve may be provided with an axial bore extending the entire longitudinal length thereof.

This provides for a fluid bleed from inlet to outlet, even after closure has occurred.

While there is herein shown and described the preferred embodiments of the present invention, it is to be understood the invention may be embodied otherwise than is herein illustrated and described and that the in said embodiments, certain changes in the detailed construction, and in the form and arrangement of parts may be made without departing from the underlying idea or principles of this invention within the scope of the appended claims.

Having thus described my invention, what I claim as new, useful and non-obvious and, accordingly, secure by Letters Patent of the United States is:

1. An excess flow control device including a housing, a fluid inlet passage therein, and a fluid outlet passage in communication with said fluid inlet passasge, the fluid control device comprising:
    (a) a reciprocating valve capable of permitting, limiting or precluding communication between said inlet and outlet passasges, said valve comprising a ferromagnetic armature capable of receiving an axis of magnetic polarity substantially co-linear with its axis of reciprocation, said magnetic axis generally corresponding to the longitudinal center of a chamber within said housing, said chamber having a greater radius than the radius of said valve, in which said valve may reciprocate, said valve having a flow-responsive rear radial end face disposed within a region of communication between said inlet and outlet passages, said valve occupying at least a part of said region of inlet-outlet communication, said valve further having a front end face capable of closing said fluid outlet passage when said valve is reciprocated in the direction of said outlet passage;
    (b) bias and calibration means disposed within said housing and disposed co-linearly and distal-proximately to said reciprocating valve, near said rear radial end face thereof, and opposite to said flow-responsive rear end face of said valve, said bias and calibration means having an axis of magnetic polarity substantially co-linear with said magnetic axis of said reciprocating valve in which the magnetic polarities of said reciprocating valve and of said bias means define an attraction mode with respect to each other; and
    (c) means for changing the axial distal-proximate position of said bias means relative to said reciprocating valve to thereby calibrate the degree of attraction between bias means and said valve and to further thereby define the geometry of that part of the region of inlet-outlet communication that passes between said flow-responsive rear radial end face of said valve and said bias means,
whereby the rate or pressure of flow through the inlet or outlet passage causing closure may be calibrated by a distal-proximate adjustment of said bias means relative to said flow-responsive rear end face.

2. The flow control device recited in claim 1 in which said valve reciprocating chamber further includes detent means for limiting the closest approach of said rear end face to said bias means.

3. The flow control device recited in claim 2 in which said fluid inlet passage is disposed near the front radial end face of said reciprocating valve thereby creating a region of fluid migration defined by the annular volume between the inner radius of said reciprocating valve chamber and the outer radius of said reciprocating valve, said region of annular migration leading to that part of the region of inlet-outlet communication defined between said flow-responsive rear radial end face and said bias means.

4. The flow control device recited in claim 2 in which said fluid inlet passage passes directly into the region of inlet-outlet communication defined by the geometry between said flow-responsive rear radial end face and said bias means.

5. The flow control device as recited in claim 3 in which said reciprocating valve further includes an axial bore extending the entire longitudinal length thereof, thereby providing a fluid bleed to the outlet after closure has occurred.

6. The flow control device as recited in claim 4 in which said reciprocating valve further includes an axial bore extending the entire longitudinal length thereof, thereby providing a fluid bleed to the outlet after closure has occurred.

* * * * *